United States Patent
Takatsu

(10) Patent No.: US 10,209,683 B2
(45) Date of Patent: Feb. 19, 2019

(54) OPTIMIZATION APPARATUS AND OPTIMIZATION APPARATUS CONTROL METHOD

(71) Applicant: FUJITSU LIMITED, Kawasaki-shi, Kanagawa (JP)

(72) Inventor: Motomu Takatsu, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/718,949

(22) Filed: Sep. 28, 2017

(65) Prior Publication Data

US 2018/0107172 A1    Apr. 19, 2018

(30) Foreign Application Priority Data

Oct. 14, 2016  (JP) .................................. 2016-202332

(51) Int. Cl.
| | | |
|---|---|---|
| *G05B 13/02* | (2006.01) | |
| *G05D 23/19* | (2006.01) | |
| *G06F 7/58* | (2006.01) | |

(52) U.S. Cl.
CPC ....... *G05B 13/021* (2013.01); *G05D 23/1917* (2013.01); *G06F 7/588* (2013.01)

(58) Field of Classification Search
CPC .......................... G05B 13/021; G05D 23/1917
See application file for complete search history.

(56) References Cited

U.S. PATENT DOCUMENTS

| | | | | |
|---|---|---|---|---|
| 9,898,024 | B2* | 2/2018 | Holub | ........................ G05F 1/66 |
| 2011/0291748 | A1* | 12/2011 | Li | ......................... G06F 1/3228 |
| | | | | 327/544 |
| 2015/0106642 | A1* | 4/2015 | Naffziger | .................. G06F 1/26 |
| | | | | 713/340 |

FOREIGN PATENT DOCUMENTS

| | | |
|---|---|---|
| JP | 06-19507 | 1/1994 |
| JP | 09-34951 | 2/1997 |
| JP | 10-293756 | 11/1998 |

OTHER PUBLICATIONS

H. Zhu et.al., "A Boltzmann Machine with Non-rejective Move", IEICE Transactions on Fundamentals of Electronics, Communications and Computer Sciences, vol. E85-A, No. 6., pp. 1229-1235, Jun. 2002 (7 pages).

* cited by examiner

*Primary Examiner* — Vincent H Tran
(74) *Attorney, Agent, or Firm* — Fujitsu Patent Center

(57) ABSTRACT

When a transition control section stochastically determines on the basis of a temperature, an energy change, and a random number whether to allow one of a plurality of state transitions according to a relative relationship between the energy change and a thermal excitation energy, the transition control section adds an offset to the energy change and exercises control so as to set the offset at a local minimum, at which an energy is locally minimized, to be larger than an offset at the time of the energy not being minimized.

9 Claims, 16 Drawing Sheets

| STATE | Q1 | Q2 | Q3 | D1 | D2 | D3 |
|---|---|---|---|---|---|---|
| 0 | 0 | 0 | 0 | 0 | 0 | f |
| 1 | 0 | 0 | 1 | 0 | 1 | 0 |
| 2 | 0 | 1 | 0 | 0 | 1 | 1 |
| 3 | 0 | 1 | 1 | 1 | 0 | 0 |
| 4 | 1 | 0 | 0 | 0 | 0 | 0 |

FIG. 5

OPTIMIZATION APPARATUS AND OPTIMIZATION APPARATUS CONTROL METHOD

CROSS-REFERENCE TO RELATED APPLICATION

This application is based upon and claims the benefit of priority of the prior Japanese Patent Application No. 2016-202332, filed on Oct. 14, 2016, the entire contents of which are incorporated herein by reference.

FIELD

The embodiments discussed herein are related to an optimization apparatus and an optimization apparatus control method.

BACKGROUND

Information processing is performed in all fields in the present society. This information processing is performed by the use of arithmetic units such as computers. Various pieces of data are calculated and processed to obtain meaningful results. By doing so, prediction, determination, control, and the like are performed. One field of this information processing is an optimization process and the optimization process is an important field. The problem of finding a solution which minimizes resources or costs needed for performing a process, the problem of finding a solution which maximizes a result obtained by performing a process, and the like are known. It is clear that these problems are very important.

Linear programming is a typical optimization problem. With linear programming, a vector of variables which maximize or minimize an evaluation function represented by the linear sum of plural continuous variables under restrictive conditions represented by linear sums is found. Linear programming is used in various fields such as a product production plan. With linear programming, excellent algorithms, such as a simplex method or interior point methods, are known. Even a problem including hundreds of thousands or more of variables is efficiently solved.

On the other hand, many optimization problems in which variables have not continuous values but discrete values are known. For example, a traveling salesman problem in which the shortest path at the time of going the rounds of plural cities in turn and making a return is found or a knapsack problem in which a combination that maximizes the sum of the value of different articles put in a knapsack is found is known. These problems are referred to as a discrete optimization problem, a combinatorial optimization problem, or the like. With these problems it is known that it is very difficult to obtain an optimum solution.

The major cause of difficulty in solving a discrete optimization problem is as follows. Because each variable has only a discrete value, the technique of reaching an optimum solution by continuously changing a variable so as to improve an evaluation function is not usable. Furthermore, in addition to a value of each variable (optimum solution, a global solution, or a global minimum) by which an optimum solution is obtained, there are a great many solutions (minimal (maximal) solutions, local solutions, or local minimums) by which the extreme value of an evaluation function is locally obtained. Accordingly, in order to reliably obtain an optimum solution, it is inevitable that an algorithm, such as substituting a value for each variable one by one, will be adopted. This leads to a very long calculation time. Discrete optimization problems include many problems for which it is expected that calculation time taken to find an optimum solution exponentially increases with respect to the size of a problem (that is to say, the number of variables). These problems are referred to as non-deterministic polynomial (NP)-hard problems in computational complexity theory. The above traveling salesman problem and knapsack problem are NP-hard problems.

As stated above, it is very hard to reliably find an optimum solution of a discrete optimization problem. Accordingly, with a discrete optimization problem which is practically important, an algorithm using a property inherent in the problem is devised. As stated above, with many discrete optimization problems it is expected that calculation time taken to obtain an exact solution exponentially increases. Therefore, many practical solutions are approximate solutions. An optimum solution is not obtained, but a solution by which a value of an evaluation function is approximate to an optimum value is obtained.

Not only these approximation algorithms specializing in individual problems but also approximation algorithms which may handle a wide range of problems because of solving them without using their properties are known. The latter approximation algorithms are referred to as metaheuristics. A simulated annealing (SA) method, a genetic algorithm, a neural network, and the like are metaheuristics. These metaheuristics may be inefficient compared with an algorithm which properly uses the property of a problem. With these metaheuristics, however, it is expected to obtain a solution at a high speed compared with an algorithm by which an exact solution is obtained.

The present disclosure relates to a simulated annealing method.

A simulated annealing method is a type of Monte Carlo method and stochastically finds a solution by the use of random numbers. Description will now be given with the problem of minimizing a value of an evaluation function to be optimized as an example. A value of an evaluation function will be referred to as energy. In the case of maximization, a sign of an evaluation function should be changed.

The beginning is an initial state in which one discrete value is substituted for each variable. A state (state in which a value of only one variable is changed, for example) close to the current state (combination of values of variables) is selected and the state transition from the current state to the selected state is discussed. A change in energy caused by that state transition is calculated. Whether to adopt that state transition and make a change in state or to keep the original state without adopting that state transition is stochastically determined according to a calculated value. If an adoption probability at the time of a decrease in the energy is larger than an adoption probability at the time of an increase in the energy, then it is expected that on average, a change in state occurs in a direction in which the energy decreases and that a state transition to a more suitable state is made with time. Finally, an optimum solution or an approximate solution by which an energy close to an optimum value is obtained may be obtained. If adoption and non-adoption are deterministically performed in the case of a decrease and an increase, respectively, in the energy, then a change in the energy decreases with respect to time. However, if the state reaches a local minimum, no further change occurs. As stated above, with a discrete optimization problem there are a great many local minimums. As a result, it is approximately certain that a state is trapped into a local minimum not very close to an optimum value. Therefore, it is important to stochastically determine whether to perform adoption.

With simulated annealing, it is proved that a state reaches an optimum solution at a limit at which time (the number of iterations) is infinite by determining an adoption (allowance) probability of a state transition in the following way.

(1) An energy change (energy decrease) value associated with a state transition is $-\Delta E$. An allowance probability p of the state transition is determined by one of the following functions f(x):

$$p(\Delta E, T) = f(-\Delta E/T) \quad (1\text{-}1)$$

$$f_{metro}(x) = \min(1, e^x) \text{(METROPOLIS METHOD)} \quad (1\text{-}2)$$

$$f_{Gibbs}(x) = \frac{1}{1+e^{-x}} \text{(GIBBS METHOD)} \quad (1\text{-}3)$$

where T is a parameter referred to as a temperature and is changed in the following way.

(2) The temperature T is lowered logarithmically in accordance with $$T = \frac{T_0 \log(c)}{\log(t+c)} \quad (2)$$

where t is the number of iterations and $T_0$ is an initial temperature. It is desirable to set $T_0$ to a sufficiently large value according to a problem.

It is assumed that an allowance probability given by the expression in (1) is used and that a steady state is reached after a sufficient number of iterations. Then an occupation probability of each state follows Boltzmann distribution in a thermal equilibrium state in the thermodynamics. When a temperature is gradually lowered from a high value, an occupation probability of a low energy state increases. Therefore, when a temperature is sufficiently lowered, the lowest energy state will be obtained. This is very similar to a change in state which occurs at the annealing of a material. Accordingly, this method is referred to as a simulated annealing method. At this time a state transition by which energy increases occurs stochastically. This corresponds to thermal excitation in the physics.

As stated above, with a simulated annealing method an optimum solution is obtained by setting an infinite number of iterations. In reality, however, there is a need to obtain a solution by setting a finite number of iterations. Therefore, it is impossible to reliably find an optimum solution. Furthermore, according to the above expression, temperature lowers very slowly. As a result, temperature does not sufficiently lower in a finite time. Accordingly, with an actual simulated annealing method, temperature does not change logarithmically. That is to say, in many cases, temperature is lowered more quickly.

FIG. 13 illustrates the schematic structure of an optimization apparatus based on a simulated annealing method. The following description includes a case where a plurality of candidate state transitions are generated. With an original basic simulated annealing method, however, one candidate state transition is generated at a time.

First an optimization apparatus 10 includes a state holding section 11 which holds a current state S (values of plural state variables). Furthermore, the optimization apparatus 10 includes an energy calculation section 12. When one of the values of the plural state variables changes, a state transition from the current state S occurs. The energy calculation section 12 calculates an energy change $\{-\Delta E_i\}$ for each state transition. The optimization apparatus 10 also includes a temperature control section 13 which controls a temperature T and a transition control section 14 which controls a change in state.

On the basis of a temperature T, energy changes $\{-\Delta E_i\}$, and random numbers, the transition control section stochastically generates at most one state transition according to relative relationships between the energy changes $\{-\Delta E_i\}$ and thermal excitation energies.

The transition control section 14 is subdivided further. That is to say, the transition control section 14 includes a candidate generator 14a which generates candidate state transitions and a transition assessor 14b which stochastically determines from an energy change $\{-\Delta E_i\}$ and a temperature T whether to allow a corresponding candidate state transition. Furthermore, the transition control section 14 includes a transition determiner 14c which selects a candidate state transition to be adopted from among allowed candidate state transitions and a random number generator 14d which generates random numbers.

The following operation is performed in one iteration. First the candidate generator 14a generates one or more candidate state transitions (candidate number $\{Ni\}$) from the current state S held in the state holding section 11 to a next state. The energy calculation section calculates an energy change $\{-\Delta E_i\}$ for each candidate state transition by the use of the current state S and the candidate state transition. The transition assessor 14b uses a temperature T generated by the temperature control section 13 and a random variable (random number) generated by the random number generator 14d to determine, according to an energy change $\{-\Delta E_i\}$ for each candidate state transition, whether to allow the candidate state transition with an allowance probability given by the expression in the above (1). Furthermore, the transition assessor 14b outputs the propriety $\{fi\}$ of each candidate state transition. If there are a plurality of allowed candidate state transitions, then the transition determiner 14c selects one of them at random by the use of a random number. In addition, the transition determiner 14c outputs a transition number N and a transition propriety f of the selected state transition. If there is an allowed candidate state transition, then a value of a state variable stored in the state holding section 11 is updated according to the adopted state transition.

The operation is started from an initial state. At the same time that a temperature is being lowered by the temperature control section 13, the above iteration is repeated. When the end determination condition that the number of iterations reaches a certain number, the end determination condition that energy falls below a certain value, or the like is met, the operation ends. A solution outputted by the optimization apparatus 10 is a state at end time. In reality, however, a temperature does not become zero if the number of iterations is finite. Accordingly, even at the end time an occupation probability of a state has distribution represented by Boltzmann distribution or the like. An optimum value or a good solution is not always obtained. That is to say, a realistic solution is to hold the lowest energy state obtained until then in the course of an iteration and to output it at the end.

FIG. 14 is a circuit-level block diagram illustrative of an example of the structure of a calculation part needed for a transition control section, more particularly for a transition assessor based on ordinary simulated annealing which generates one candidate state transition at a time.

A transition control section 14 includes a random number generation circuit 14b1, a selector 14b2, a noise table 14b3, a multiplier 14b4, and a comparator 14b5.

The selector 14b2 selects an energy change $\{-\Delta E_i\}$ corresponding to a transition number N which is a random number generated by the random number generation circuit 14b1 from among energy changes $\{-\Delta E_i\}$ calculated for candidate state transitions and outputs it.

The function of the noise table 14b3 will be described later. For example, a memory, such as a random access memory (RAM) or a flash memory, is used as the noise table 14b3.

The multiplier 14b4 outputs the product (corresponding to the above thermal excitation energy) of a value outputted by the noise table 14b3 and a temperature T.

The comparator 14b5 outputs as a transition propriety f a comparison result obtained by comparing a multiplication result outputted by the multiplier 14b4 and $-\Delta E$ which is an energy change selected by the selector 14b2.

The transition control section 14 illustrated in FIG. 14 basically has the above function. However, a mechanism for allowing a state transition with an allowance probability given by the expression in (1) is not yet described. This mechanism will now be described.

A circuit which outputs 1 with an allowance probability of p and which outputs 0 with an allowance probability of (1−p) is realized in the following way. A comparator having two inputs A and B is used. When A>B, the comparator outputs 1. When A<B, the comparator outputs 0. An allowance probability of p is inputted to the input A. A uniform random number having a value in the interval [0, 1) is inputted to the input B. Therefore, by inputting to the input A of this comparator a value of an allowance probability p calculated by the use of the expression in (1) on the basis of an energy change and a temperature T, the above function is realized.

That is to say, it is assumed that f is the function used in the expression in (1) and that u is a uniform random number having a value in the interval [0, 1). Then the above function is realized by a circuit which outputs 1 when $f(\Delta E/T)$ is greater than u.

The above function is realized in this way. By making the following modification, however, the same function is also realized. Even if the same monotone increasing function is made to operate on two numbers, the magnitude relationship between them does not change. Therefore, even if the same monotonically increasing function is made to operate on two inputs of a comparator, its output does not change. If $f^{-1}$ which is an inverse function of f is adopted as this monotonically increasing function, a circuit which outputs 1 when $-\Delta E/T$ is greater than $f^{-1}(u)$ may be used. Furthermore, a temperature T is positive. Therefore, a circuit which outputs 1 when $-\Delta E$ is greater than $Tf^{-1}(u)$ may be used. The noise table 14b3 illustrated in FIG. 14 is a conversion table for realizing the inverse function $f^{-1}(u)$ and outputs values of the following functions for an input obtained by discretizing the interval [0, 1):

$$f_{metro}^{-1}(u) = \log(u) \quad (3\text{-}1)$$

$$f_{Gibbs}^{-1}(u) = \log\left(\frac{u}{1-u}\right) \quad (3\text{-}2)$$

The transition control section 14 also includes a latch which holds a determination result and the like, a state machine which generates that timing, and the like. For the sake of simplicity, however, these are not illustrated in FIG. 14.

FIG. 15 illustrates the flow of the operation of the transition control section 14 based on conventional simulated annealing. The flow of the operation includes a step (S1) in which one state transition is selected as a candidate, a step (S2) in which the propriety of the state transition is determined by comparing an energy change for the state transition and the product of a temperature and a random number, and a step (S3) in which the state transition is adopted if the state transition is allowed and in which the state transition is not adopted if the state transition is not allowed.

As will be imagined in some degree from the above description, a simulated annealing method is widely used and is very attractive. However, because there is need to slowly lower temperature, calculation time is comparatively long. Furthermore, it is hard to properly adjust according to a problem how to lower temperature. This will be described in the following way by the use of FIG. 16.

There are many local minimums whose approximation degrees are low along a state transition path from an initial state to an optimum solution or good approximate solutions. In order to escape from these local minimums sufficiently quickly, a high temperature which enables sufficient thermal excitation is needed. However, an energy spread in Boltzmann distribution is wide at a high temperature. Therefore, the difference in occupation probability between an optimum solution or good approximate solutions whose energy is low (hereinafter referred to as a good solution) and a local minimum whose energy is comparatively high and whose approximation degree is low (hereinafter referred to as a bad solution) is small. Accordingly, even if a quick escape from a local minimum is made, destinations are dispersed to many bad solutions and the probability that a good solution will be reached is very small. In order to increase an occupation probability of a good solution, a low temperature at which thermal excitation energy is sufficiently low compared with the difference in energy between the good solution and a bad solution is needed. In this case, however, thermal excitation energy is low. As a result, the probability of going beyond a peak of energy along the path is very low and a change in state hardly occurs. Therefore, there is need to gradually increase an occupation probability of a good solution by slowly going through an intermediate temperature at which it is possible in some degree to go beyond a peak of energy and at which there is a little difference in occupation probability. If temperature is lowered too slowly, it does not fall appreciably in finite time. As a result, an occupation probability of a good solution does not finally increase. Conversely, if temperature is lowered too quickly, it falls before an escape from a local minimum is made. As a result, a state remains trapped into a bad solution. Therefore, as temperature falls, the rate of a change in the temperature is made sufficiently small. There is need to substantially wait until Boltzmann distribution at the temperature is approached.

As has been described, with the original simulated annealing, an escape from a local minimum is made only by thermal excitation based on temperature. Accordingly, there is need to slowly lower temperature. Furthermore, there is need to properly adjust according to a problem how to lower temperature.

The problem of being trapped into a local minimum may be alleviated by a method other than temperature adjustment. A temperature control method or an evaluation function is dynamically changed (see, for example, Japanese Laid-open Patent Publication No. 06-19507 or Japanese Laid-open Patent Publication No. 09-34951). A method for generating a neighbor which is a state transition destination is dynamically changed (see, for example, Japanese Laid-open Patent Publication No. 10-293756). With these methods, a search is conducted in a wide range during the early stages of calculation and a search is conducted with high accuracy in a narrow range in the last stage of calculation. By doing so, calculation time is reduced.

With these methods, for example, plural functions are dynamically replaced or statistics are collected to grasp the progress of a search. That is to say, comparatively complex calculations are needed. It is desirable to reduce calculation time by a simpler general-purpose method.

As stated above, with the simulated annealing method it takes a long time to escape from a local minimum. This is the main cause of a long calculation time. Therefore, if there is a method which promotes an escape from a local minimum, it is expected that calculation time is significantly reduced. However, simply escaping from a local minimum does not always reduce calculation time. As stated above, there are a great many bad solutions. Therefore, even if an escape from a local minimum is made at random, a state is simply trapped again into a surrounding bad solution. Not a simple escape but an escape for making a state transition to a better state is desirable.

There is a hint about an escape for proceeding in a good direction in the convergence theorem of the above simulated annealing method. This theorem indicates determining the propriety of a state transition in accordance with a state transition probability of the Metropolis method or the Gibbs method leads to proceeding in a good direction.

At a local minimum, a state transition probability is very small. Accordingly, a candidate state transition is selected many times. The branching ratio of state transitions after that is proportional to a state transition probability of the Metropolis method or the Gibbs method. Therefore, if the absolute values of allowance probabilities of state transitions are increased with the relative ratio of the allowance probabilities maintained, then the branching ratio of the state transitions is maintained. This makes it possible to reduce the length of a stay at a local minimum without exerting a bad influence upon convergence. As a result, calculation time is reduced.

A problem to be solved in the present disclosure is to obtain means to promote an escape from a local minimum without dynamically changing an evaluation function, a state transition generation method, or the like or marring convergence. More specifically, a problem to be solved in the present disclosure is to obtain means to increase the absolute values of allowance probabilities of state transitions at a local minimum are increased with the relative ratio of the allowance probabilities maintained.

H. Zhu et al., "A Boltzmann Machine with Non-rejective Move", IEICE Transactions on Fundamentals vol. E85-A, No. 6. pp. 1229-1235, June 2002 is one of these means. There are errors in the description of this literature. However, the above problem is solved by making suitable corrections. This means is as follows. Allowance probabilities of all state transitions are calculated. When the maximum ratio of an allowance probability to a random number having exponential distribution is obtained, this allowance probability is adopted. This makes it possible to select a state transition to be adopted at a rate proportional to an original allowance probability. With this means, the relative ratio of allowance probabilities is maintained and the probability of staying in an original state is zero. Therefore, this means is very effective. However, an increase in computational complexity is caused by calculating an allowance probability and generating a random number.

SUMMARY

According to an aspect, there is provided an optimization apparatus including a state holding section that holds values of a plurality of state variables included in an evaluation function indicative of an energy; an energy calculation section that calculates an energy change of the energy for each of a plurality of state transitions in a case where each of the plurality of state transitions occurs according to a change in one of the values of the plurality of state variables; a temperature control section that controls a temperature; and a transition control section that adds, when stochastically determining based on the temperature, the energy change, and a random number whether to allow one of the plurality of state transitions according to a relative relationship between the energy change and a thermal excitation energy, an offset to the energy change and that exercises control so as to set the offset at a local minimum, at which the energy is locally minimized, to be larger than an offset at the time of the energy not being minimized.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a truth table of a logic circuit which generates a pulse signal;

DESCRIPTION OF EMBODIMENTS

Figure 1:
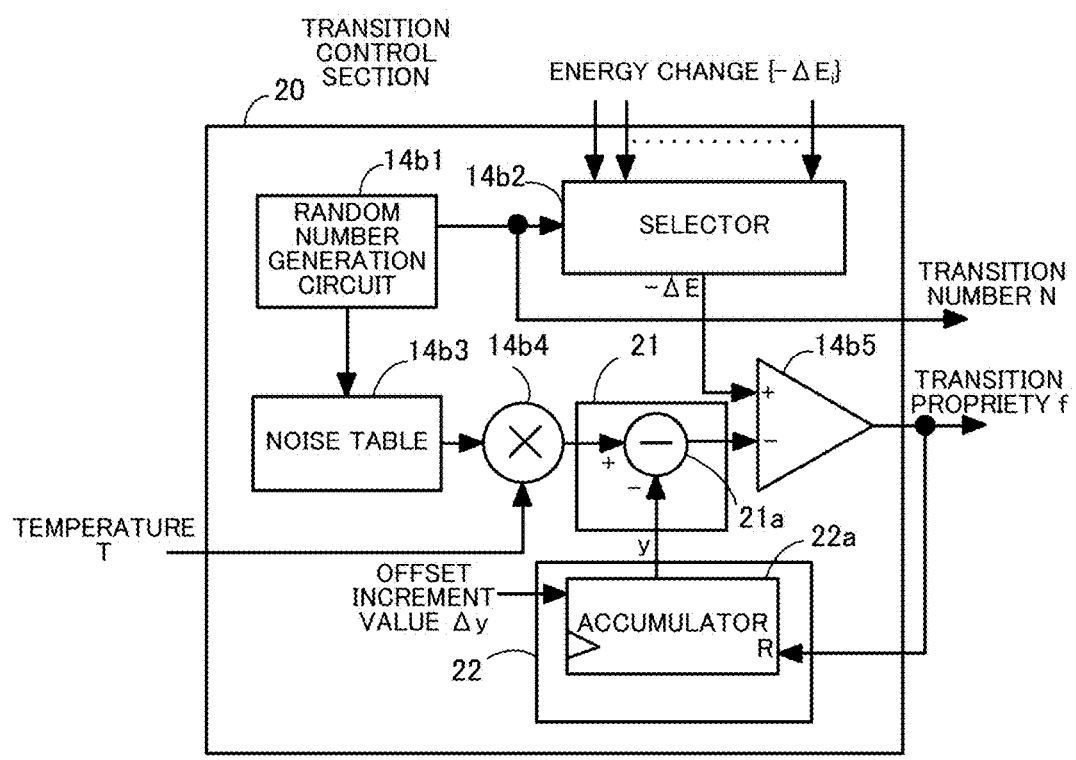
FIG. 1 illustrates an example of the structure of a transition control section based on a simulated annealing method in the present disclosure.
Figure 14:
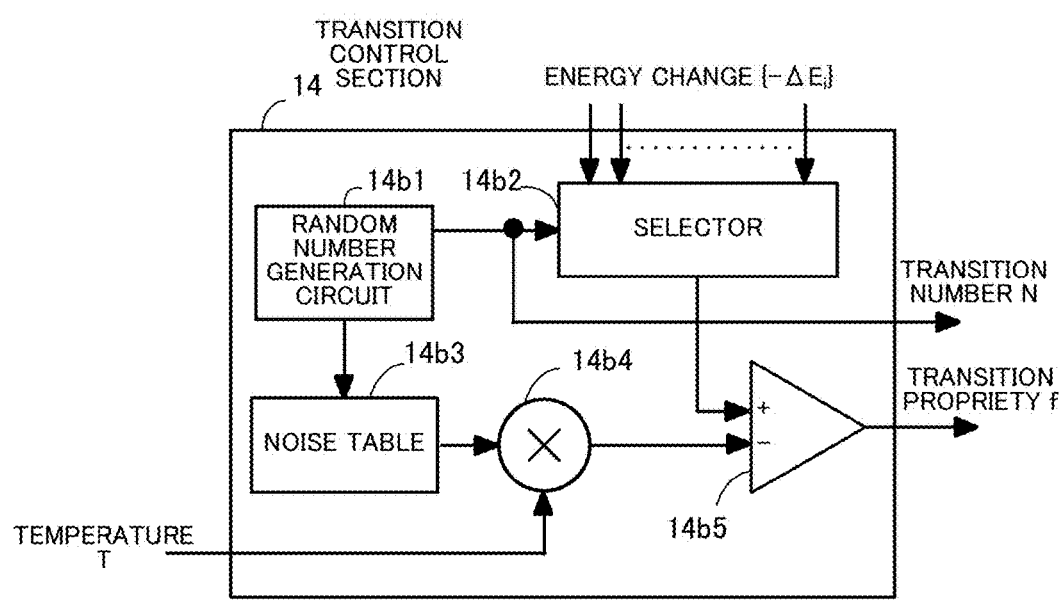
FIG. 14 is a circuit-level block diagram illustrative of an example of the structure of a calculation part needed for a transition control section, more particularly for a transition assessor based on conventional simulated annealing.
Figure 15:
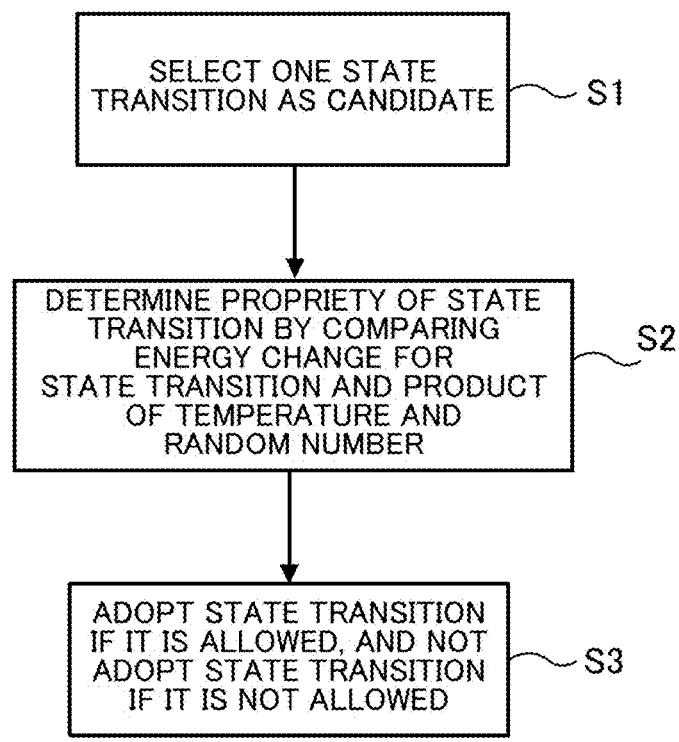
FIG. 15 illustrates the flow of the operation of the transition control section based on conventional simulated annealing.
Figure 16:
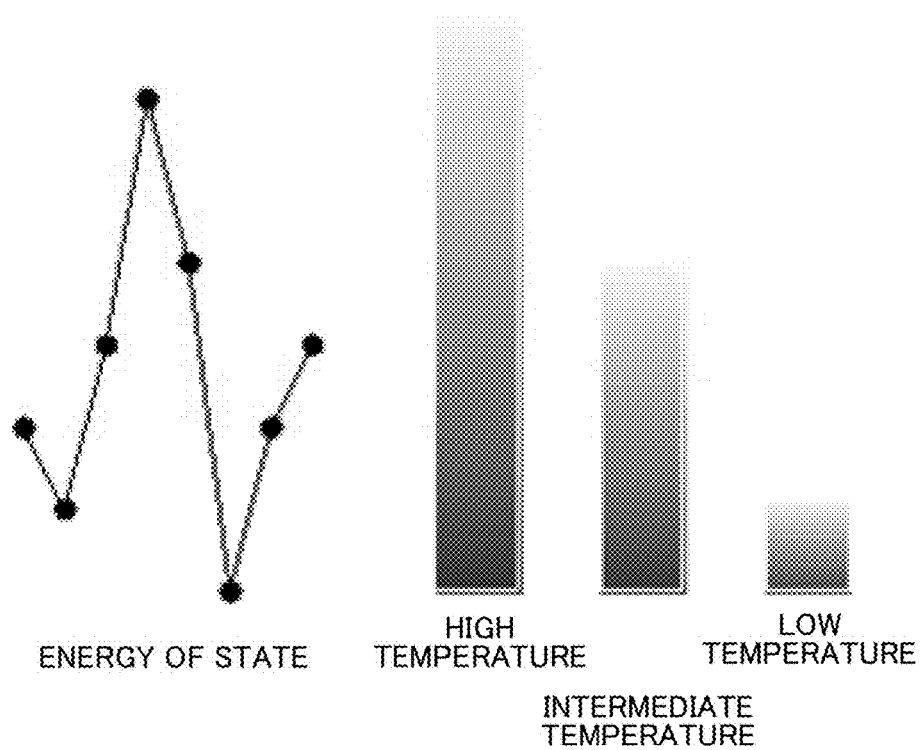
FIG. 16 illustrates the concept of an occupation probability of a state in a pseudo-random number method.

FIG. 1 illustrates an example of the structure of a transition control section based on a simulated annealing method proposed in the present disclosure and having the function of promoting an escape from a local minimum. Components in FIG. 1 which are the same as those included in the transition control section 14 illustrated in FIG. 14 are marked with the same numerals.

Figure 13:
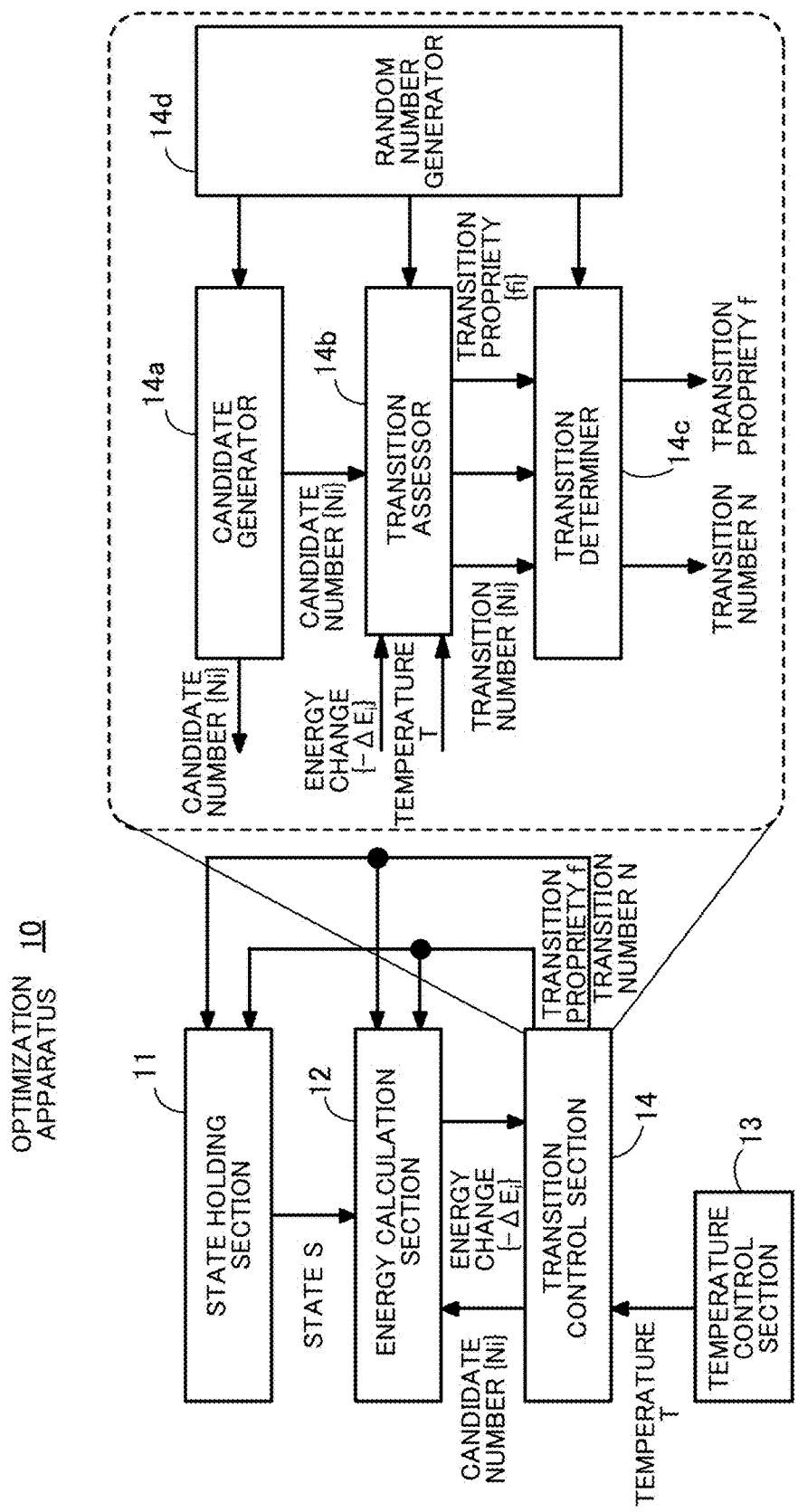
FIG. 13 illustrates the schematic structure of an optimization apparatus based on a simulated annealing method.

As illustrated in FIG. 1, a transition control section 20 includes an offset addition circuit 21 and an offset control circuit 22 added to a circuit part which realizes the function of the transition assessor 14b illustrated in FIG. 13. The other components are the same as those included in the transition control section 14 illustrated in FIG. 14.

The offset addition circuit 21 functions as an offset addition circuit which adds an offset y to an energy change $(-\Delta E)$ corresponding to a state transition. In the example of FIG. 1, the offset addition circuit 21 is a subtractor 21a. Therefore, in the example of FIG. 1, an offset y is subtracted from the product $Tf^{-1}(u)$ of a temperature T and a random number (corresponding to thermal excitation energy) which is an object of comparison in place of adding an offset y to an energy change $(-\Delta E)$. However, these are the same.

The offset control circuit 22 exercises control so as to set the offset y at a local minimum (solution at which energy is minimized) to be larger than an offset at the time of a local minimum not being obtained. In the example of FIG. 1, the offset control circuit 22 is an accumulator 22a having a reset terminal R. When a transition propriety f inputted to the reset terminal R indicates that a state transition is allowed (that is to say, when a state transition occurs), the accumulator 22a sets the offset y to zero. Furthermore, the accumulator 22a has an input terminal and a clock terminal. When a transition propriety f indicates that a state transition is not allowed (that is to say, when a state transition does not occur), the accumulator 22a adds an offset increment value $\Delta y$ inputted to the input terminal to the offset y each time a pulse signal (not illustrated) is inputted to the clock terminal.

The pulse signal (not illustrated) is supplied by, for example, a state machine described later. The offset increment value $\Delta y$ is stored in, for example, a register (not illustrated).

When the sum $(-\Delta E+y)$ of an energy change $(-\Delta E)$ selected by a selector 14b2 and the offset y held in the accumulator 22a is greater than the product $Tf^{-1}(u)$ of a temperature T and a random number, the above transition control section 20 allows a state transition.

Furthermore, the accumulator 22a changes the offset y in the following way. If an allowed state transition exists and the state transition occurs, the accumulator 22a resets the offset y to zero. If an allowed state transition does not exist and the state transition does not occur, the accumulator 22a increases the offset y by the offset increment value $\Delta y$.

Figure 2:
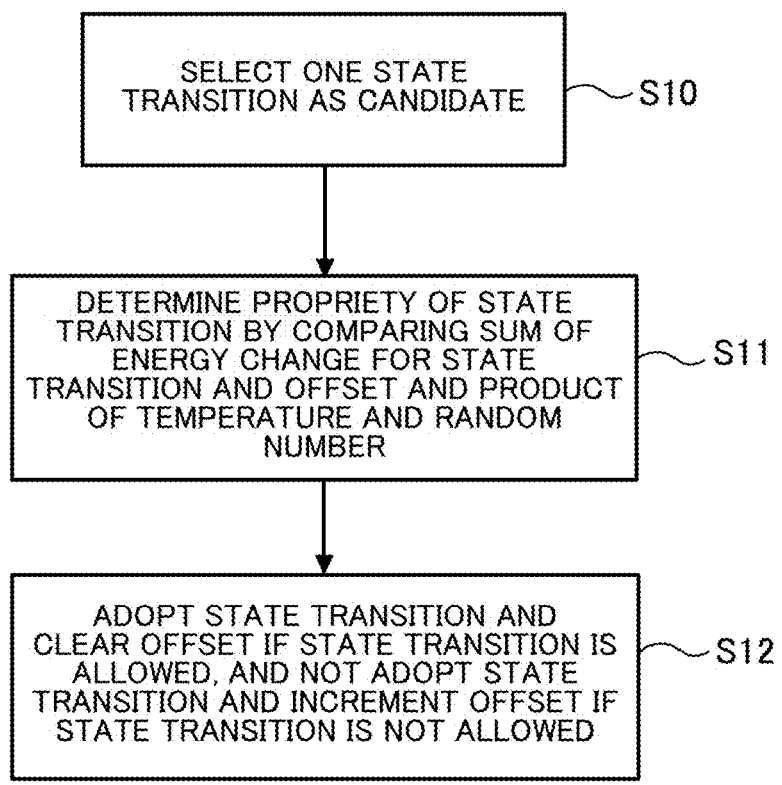
FIG. 2 illustrates the flow of the operation of the transition control section in the present disclosure.

The flow of operations performed for determining the propriety of a state transition will be summarized in FIG. 2.

The flow of operations includes a step (S10) in which one state transition is selected as a candidate, a step (S11) in which the propriety of the state transition is determined by comparing the sum of an energy change $(-\Delta E)$ for the state transition and the offset y and the product of a temperature T and a random number, and a step (S12) in which if the state transition is allowed, the state transition is adopted and the offset y is cleared and in which if the state transition is not allowed, the state transition is not adopted and the offset y is incremented.

The other operations may be the same as those in an ordinary simulated annealing method.

An effect obtained by the transition control section 20 including the above offset addition circuit 21 and offset control circuit 22 will now be described.

When the current state is trapped in a local minimum and it is not easy to escape from it, energy changes for all state transitions have large positive values. With the Metropolis method and the Gibbs method an allowance probability of each state transition at this time is practically represented by an exponential function as indicated by:

$$f_{metro}(x) \approx f_{metro}(x) \approx e^x(x \ll -1) \qquad (4-1)$$

$$p(\Delta E, T) \approx e^{-\Delta E/T}(\Delta E \gg T) \qquad (4-2)$$

If the offset y is added to an energy change $\{-\Delta E_i\}$ at the time of determining the propriety of all the state transitions, allowance probabilities of all the state transitions are given by $$\tilde{p}(\Delta E_i, T) = p(\Delta E_i - y, T) \approx e^{(-\Delta E_i + y)/T} = e^{y/T} p(\Delta E_i, T) \qquad (5)$$

It turns out that the allowance probabilities of all the state transitions become larger at the same rate of $e^{y/T}$.

As stated above, if the absolute values of the allowance probabilities of all the state transitions are increased with the relative ratio of the allowance probabilities maintained, it is possible to reduce the length of a stay at a local minimum without changing a branching ratio of a state transition after that. Accordingly, it is expected that the use of the offset y promotes an escape from a local minimum. However, if the offset y is not properly controlled, an acceleration effect may be insufficient or convergence may deteriorate.

When the current state is not a local minimum, there is a state transition by which energy lowers. Therefore, a transition probability is not approximated by an exponential function. As a result, the use of the offset y changes a branching ratio. Accordingly, when the current state is not a local minimum, it is desirable that the offset y be zero or sufficiently small.

Furthermore, if the offset y at the time of the current state being a local minimum is constant, an acceleration effect is obtained. However, this acceleration effect is not always sufficient. It is assumed that an increase in energy caused by each state transition is large. Even if the offset y is given, a transition probability remains very small. If it is not easy, even by giving the offset y, to escape from a local minimum, then it is desirable to use a larger offset y.

In order to solve this, the offset control circuit 22 illustrated in FIG. 1 gradually increases the offset y at the time of a state transition not occurring. When a state transition occurs, the offset control circuit 22 resets the offset y to zero.

If a state remains at a local minimum, the offset y gradually increases. Accordingly, an escape from the local minimum is certainly made at some time. Furthermore, if a state is not a local minimum, resets are frequently caused by state transitions. As a result, the offset y is zero or small. Therefore, the offset y does not have a great influence on a branching ratio.

It is also desirable to properly select the offset increment value Δy. A large offset increment value Δy makes it possible to quickly escape from a local minimum. However, if the offset increment value Δy is too large, a branching ratio may be influenced by the offset y. The reason for this is that even when the current state is not a local minimum, a state transition does not always occur every time. Furthermore, when the current state is a local minimum, the offset y becomes large before a state transition for which an increase in energy is comparatively small and whose allowance probability will become high is selected as a candidate. As a result, a branching ratio may deviate from a correct value. In order not to have a great influence on a branching ratio, it will be desirable to set the average length of a stay at a local minimum to be about several times the average length of a stay in a state which is not a local minimum.

It turns out from the above description that if the offset increment value Δy is properly selected, it is possible, without having a bad influence on convergence, to reduce the length of a stay at a local minimum and therefore reduce calculation time for optimization.

An inspection of this result by a software simulation, together with embodiments below, will be described later.

By the way, the present disclosure reduces calculation time by adding the above new functional block to the transition control section 14 of FIG. 13 which realizes the simulated annealing method in the above way, more particularly to the transition assessor 14b. There is no need to make changes in the other components. Therefore, the present disclosure is applicable without depending on a set of state transitions allowed for the current state, a function form which gives a change in energy caused by a state transition, a method for calculating a change in energy caused by a state transition, or the like. The concrete circuit structure of these components will not be described in detail.

However, a simulated annealing method in which energy to be optimized is represented by an Ising model and the generation of a candidate state transition and a method for calculating a change in energy caused by a state transition in optimization by a Boltzmann machine approximately equivalent to the simulated annealing method based on the Ising model will now be described briefly.

The Ising model represents a system which consists of N spins that interact with one another. Each spin $s_i$ has two values, that is to say, ±1. Energy of the system is given by $$E = \frac{1}{2}\sum_{i,j} J_{i,j} s_i s_j + \sum_i h_i s_i \quad (6)$$

where $J_{i,j}$ is an interaction coefficient between spins $s_i$ and $s_j$ and $h_i$ is an external magnetic field coefficient which is a bias field of the spin.

A candidate for a state transition from the current state to a next state is the inversion of one spin. There are N candidate state transitions. Therefore, a spin number of one spin to be inverted or a set of spin numbers of spins to be inverted is generated as a candidate state transition.

A change in energy caused by the inversion of the ith spin is given by $$\Delta E_i = -2s_i \frac{\partial E}{\partial s_i} = -2s_i \left( \sum_j J_{i,j} s_j + h_i \right) \quad (7)$$

$F_i$ given by expression 8 is referred to as a local field and represents the rate of a change in energy caused by the inversion of each spin.

$$F_i = \sum_j J_{i,j} s_j + h_i \quad (8)$$

Whether to allow a state transition depends on a change in energy. Accordingly, there is basically no need to calculate energy itself. A change in energy is calculated from a local field. If the lowest energy obtained is needed as an output, a change in energy is calculated from a local field and is accumulated. By doing so, energy is found.

Furthermore, according to the following expression 9, there is no need to recalculate a local field every time by performing a matrix operation. Only the amount of a change in local fields caused by the inversion of a spin corresponding to a state transition is an interaction coefficient.

$$\frac{\partial}{\partial s_j} F_i = J_{i,j} \quad (9)$$

In addition, with a Boltzmann machine used for a neural network, a state variable has two values, that is to say, (0, 1). A Boltzmann machine used for a neural network is the same as the simulated annealing based on the Ising model in the other respects. Accordingly, approximately the same structure may be adopted. Expressions indicative of energy, an energy change, and a local field are:

$$E = \frac{1}{2}\sum_{i,j} J_{i,j} s_i s_j + \sum_i h_i s_i \quad (10)$$

$$\Delta E_i = (1 - 2s_i) \frac{\partial E}{\partial s_i} = (1 - 2s_i) \left( \sum_j J_{i,j} s_j + h_i \right) \quad (11)$$

$$F_i = \sum_j J_{i,j} s_j + h_i \quad (12)$$

With a Boltzmann machine a spin in the Ising model is often referred to as a neuron. For the sake of simplicity, however, hereinafter the term "spin" will be used.

Accordingly, the state holding section 11 illustrated in FIG. 13 is formed by the use of an N-bit register which holds values of the N spins and comparatively simple arithmetic circuits such as an adder and an exclusive-OR circuit.

As stated above, simulated annealing using the Ising model is equivalent to simulated annealing using a Boltzmann machine and the conversion from one to the other is made. With a Boltzmann machine it is easy to associate 0 and 1 of a logic circuit with a state variable. Therefore, assuming that a Boltzmann machine is used, description will now be given.

With a Boltzmann machine (and the simulated annealing using the Ising model) only one state variable changes according to a state transition. An energy change corresponding to the state transition is calculated in advance by the use of a local field. Therefore, in the following embodiments description will be given with a form in which an energy change calculated in advance is selected according to the generation of a candidate state transition as an example. However, if a model different from a Boltzmann machine is used, there are cases where a state transition by which plural state variables change is considered. As a result, a form in which an energy change needed is calculated after the generation of a candidate state transition may be advantageous.

Three embodiments of an optimization apparatus in which the use of a Boltzmann machine is assumed will now be described.

First Embodiment

Figure 3:
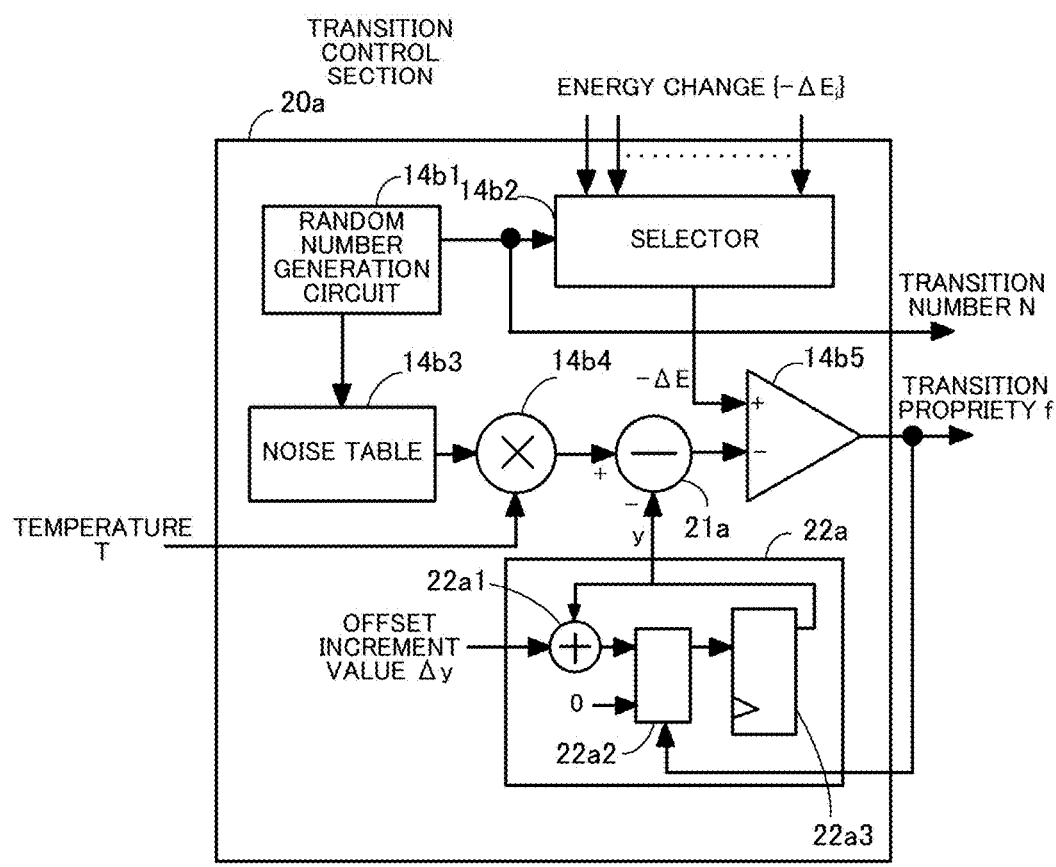
FIG. 3 illustrates an example of the circuit structure of a transition control section included in an optimization apparatus according to a first embodiment.

FIG. 3 illustrates an example of the circuit structure of a transition control section included in an optimization apparatus according to a first embodiment. Components in FIG. 3 which are the same as those included in the transition control section 20 illustrated in FIG. 1 are marked with the same numerals. A transition control section 20a in FIG. 3 is basically the same as the transition control section 20 illustrated in FIG. 1. However, FIG. 3 illustrates the structure of an accumulator 22a somewhat concretely.

The accumulator 22a includes an adder 22a1, a selector 22a2, and a register 22a3.

The adder 22a1 outputs the sum of an offset increment value Δy and an offset y outputted by the register 22a3.

When a transition propriety f indicates that a state transition is allowed, the selector 22a2 selects and outputs 0. When a transition propriety f indicates that a state transition is not allowed, the selector 22a2 selects and outputs an addition result outputted by the adder 22a1.

The register 22a3 stores a value outputted by the selector 22a2 in synchronization with a pulse signal supplied to a clock terminal, and outputs it as the offset y.

The bit width of the adder 22a1 and the register 22a3 is properly set. The bit width of the adder 22a1 and the register 22a3 may be approximately equal to that of an energy change (−ΔE). For example, if the bit width of an interaction coefficient is 16 and the number of spins is 1024, then the maximum bit width of an energy change (−ΔE) is 27. Therefore, this bit width is sufficient. In most cases, a bit width smaller than 27 is sufficient. The bit width of an output of a noise table 14b3 can be smaller than or approximately equal to that of an energy change (−ΔE).

A pulse signal inputted to the clock terminal of the register 22a3 is supplied from a state machine which controls an iteration operation of circuit operations. After the propriety of a state transition in one iteration is determined, control is exercised so that the pulse signal will become active only once.

The cycle number of a clock signal needed for determination of the propriety of a state transition and update of each parameter performed thereafter changes according to a result of the determination of the propriety. Accordingly, there is need to generate a pulse signal so as to make the pulse signal and the clock signal equal in cycle number.

A pulse signal generation method will now be described. The following case is taken as an example. The next iteration is begun after five cycles if a state is updated. The next iteration is begun after one cycle if a state is not updated.

Figure 4:
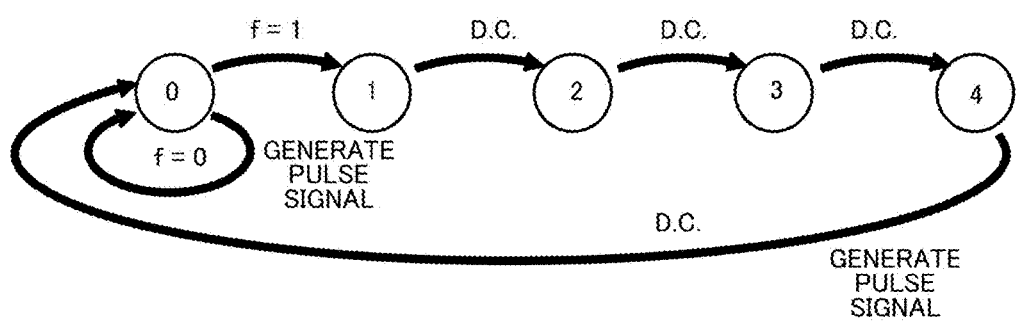
FIG. 4 is a state transition diagram illustrative of an example of a state transition associated with pulse signal generation.

FIG. 4 is a state transition diagram illustrative of an example of a state transition associated with pulse signal generation.

As illustrated in FIG. 4, a state transition is made among five states, that is to say, among states 0 to 4. If a transition propriety f is 0 in the state 0, then a pulse signal is generated. In this case, a state transition from the state 0 is not made. If a transition propriety f is 1 in the state 0, then the state transition from the state 0 to the state 1 is made. In FIG. 4, D.C. indicates don't care. That is to say, the state transition from the state 1 to the state 2, the state transition from the state 2 to the state 3, the state transition from the state 3 to the state 4, and the return from the state 4 to the state 0 are made in synchronization with a clock signal CLK regardless of a value of a transition propriety f. When the return from the state 4 to the state 0 is made, a pulse signal is generated.

A state machine for realizing the above state transitions may be a circuit which meets the following truth table.

FIG. 5 illustrates an example of a truth table of a logic circuit which generates a pulse signal.

Figure 6:
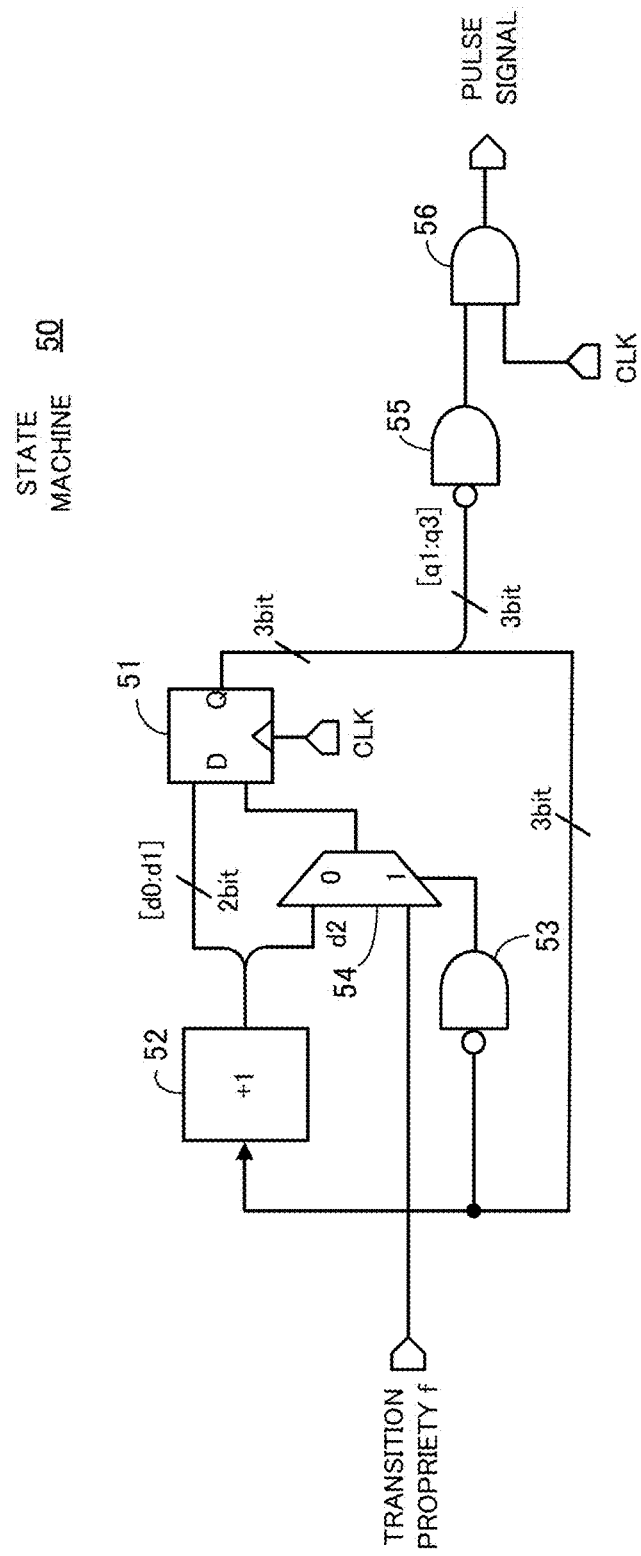
FIG. 6 illustrates an example of a state machine which generates a pulse signal.

Furthermore, FIG. 6 illustrates an example of a state machine which generates a pulse signal.

A state machine 50 includes a 3-bit flip-flop 51, an increment circuit 52, an AND circuit 53, a selector 54, and AND circuits 55 and 56. A truth table illustrated in FIG. 5 indicates the relationship between output values Q1, Q2, and Q3 and input values D1, D2, and D3 of the 3-bit flip-flop 51 in each state.

High-order 2 bits ([d0:d1]) of a 3-bit value outputted by the increment circuit 52 and a value outputted by the selector 54 are supplied to the 3-bit flip-flop 51 as the input values D1 through D3. The 3-bit flip-flop 51 stores the input values D1 through D3 in synchronization with a clock signal CLK and outputs them as the output values Q1 through Q3.

The increment circuit 52 increments the output values Q1 through Q3, which are 3 bits, outputted by the 3-bit flip-flop 51 by one. For example, if the output values Q1 through Q3 are "001" (that is to say, Q1=Q2=0 and Q3=1), then the increment circuit 52 outputs "010".

The AND circuit 53 inputs values obtained by inverting a logic level of each bit of the output values Q1 through Q3 and outputs the logical product of these values as an output value.

The least significant bit (d2) of the 3-bit value outputted by the increment circuit 52 is supplied to one input terminal of the selector 54 and a transition propriety f is supplied to the other input terminal of the selector 54. If the output value of the AND circuit 53 is 1, then the selector 54 outputs the transition propriety f. If the output value of the AND circuit 53 is 0, then the selector 54 outputs d3.

The AND circuit 55 inputs values obtained by inverting a logic level of each of 3 bits ([q1:q3]) of the output values Q1 through Q3 and outputs the logical product of these values as an output value.

The AND circuit 56 outputs as a pulse signal the logical product of the clock signal CLK and the output value outputted by the AND circuit 55.

A pulse signal is generated by the above state machine 50.

An example of the operation of the optimization apparatus according to the first embodiment will now be described.

In each iteration described above, a random number generation circuit 14b1 generates a number of a candidate state transition (transition number N) one at a time by the use of a random number. A selector 14b2 selects and outputs an energy change (−ΔE) corresponding to the state transition. Furthermore, by multiplying a value obtained by making a conversion by the noise table 14b3 on the basis of a random number, which is a uniform random number, by a temperature T, a multiplier 14b4 generates a threshold of thermal excitation energy in the Metropolis method or the Gibbs method. In addition, a subtractor 21a subtracts an offset y outputted by the accumulator 22a from the thermal excitation energy threshold. By comparing a subtraction result outputted by the subtractor 21a and the energy change (−ΔE) selected and outputted by the selector 14b2, a comparator 14b5 determines the propriety of the state transition.

When the state transition is adopted, the offset y is reset to zero by the accumulator 22a. When the state transition is not adopted and a stay in the current state is made, an offset increment value Δy is added to the offset y. By doing so, control is exercised so that the offset y will monotonically increase with respect to the length of a stay in the current state.

A standard for determining the offset increment value Δy is as follows.

As stated above, in order to obtain an acceleration effect without having a bad influence on convergence, it will be desirable to select the offset increment value Δy so as to set the length of a stay at a local minimum to be about several times the length of a stay in a state which is not a local minimum. If one candidate state transition is generated, as in this embodiment, in each iteration, the probability that each state transition will be selected as a candidate is the reciprocal of the number of all state transitions. If this is taken into consideration, it will be desirable to determine the offset increment value Δy in the following way. When the length of a stay at a local minimum becomes about several times the number of all the state transitions, the offset y becomes energy needed to escape from the local minimum.

Figure 7:
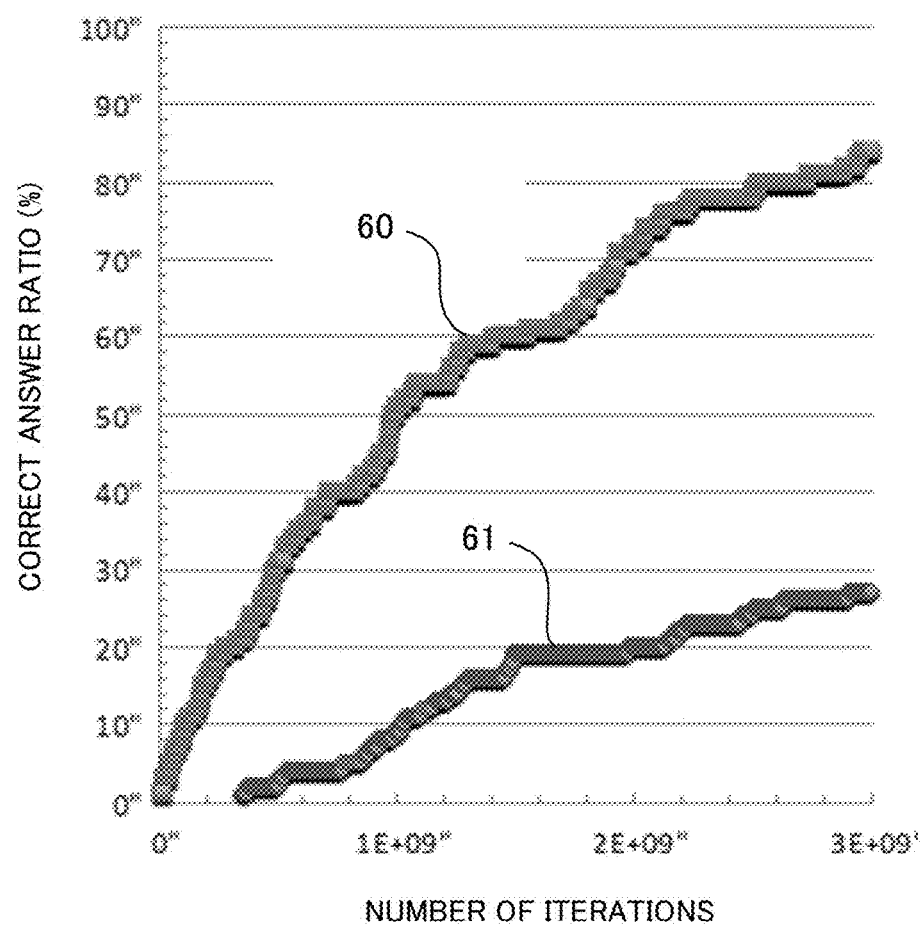
FIG. 7 illustrates an example of a software simulation result of a simulated annealing method realized by the use of the transition control section illustrated in FIG. 3.

FIG. 7 illustrates an example of a software simulation result of a simulated annealing method realized by the use of the transition control section illustrated in FIG. 3. A problem to be optimized is a traveling salesman problem including 32 cities which is formulated by the Ising model (Boltzmann machine). In FIG. 7, a horizontal axis indicates the number of iterations and a vertical axis indicates a ratio at which an optimum solution is obtained (correct answer ratio (%)). A result 60 indicates the relationship between the number of iterations and a correct answer ratio obtained by the use of the transition control section 20a illustrated in FIG. 3. A result 61 indicates the relationship between the number of iterations and a correct answer ratio obtained by the use of the transition control section 14 illustrated in FIG. 14.

As is seen from FIG. 7, the use of the transition control section 20a in the first embodiment gives a correct answer faster than the use of the transition control section 14. The number of iterations $N_{99}$ which produces a correct answer with a probability of 99 percent is given by $$N_{99} = \frac{\log(1-0.99)}{\log(1-\eta(n))} n \quad (13)$$

where n is the number of iterations and η(n) is a correct answer ratio at the number of iterations. A comparison is made by the use of $N_{99}$. If the transition control section is used, $N_{99}$ is 4.3×10$^{10}$. If the transition control section 20a in the first embodiment is used, $N_{99}$ is 7.7×10$^9$. That is to say, the use of the transition control section 20a in the first embodiment gives a correct answer about five times faster than the use of the transition control section 14.

Second Embodiment

Figure 8:
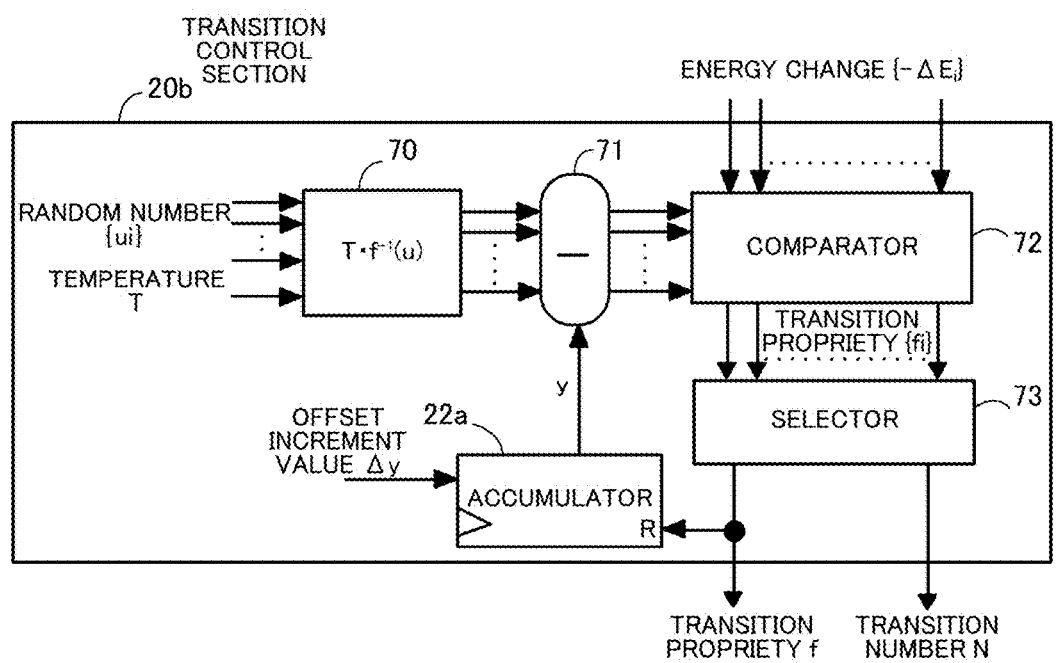
FIG. 8 illustrates an example of the circuit structure of a transition control section included in an optimization apparatus according to a second embodiment.

FIG. 8 illustrates an example of the circuit structure of a transition control section included in an optimization apparatus according to a second embodiment. A circuit which generates a random number is not illustrated in FIG. 8.

Description will now be given on the assumption that a transition control section 20b illustrated in FIG. 8 selects all one-bit flips (all one-spin changes in spin value) as candidate state transitions. However, only part of bit inversions may be selected as candidate state transitions. Furthermore, in the following description random numbers used for thermal excitation are independent of one another for candidate state transitions. However, a random number used for thermal excitation may be common to several candidate state transitions.

The transition control section 20b includes an accumulator 22a. This is the same with the transition control section 20a illustrated in FIG. 3. In addition, the transition control section 20b includes a thermal excitation energy generator 70, a subtractor 71, a comparator 72, and a selector 73.

The thermal excitation energy generator 70 includes a noise table (storage unit) which converts random numbers {ui} independent of one another for candidate state transitions to values of the above inverse function f$^{-1}$(u). Furthermore, the thermal excitation energy generator 70 outputs the product of a value outputted by the noise table and a temperature T as a thermal excitation energy threshold in the Metropolis method or the Gibbs method.

The subtractor 71 subtracts an offset y outputted by the accumulator 22a from the thermal excitation energy threshold generated according to candidate state transitions.

By comparing each subtraction result outputted by the subtractor 71 and an energy change {−ΔE$_i$}, the comparator 72 outputs a transition propriety {fi} indicative of the propriety of each state transition. The operation of the comparator 72 corresponds to outputting a comparison result obtained by comparing the sum of an energy change {−ΔEi} calculated for each state transition and the offset y and each multiplication result (thermal excitation energy).

When there are a plurality of allowed candidate state transitions on the basis of a transition propriety {fi}, the selector 73 selects one of them at random by the use of a random number. The selector 73 then outputs a number of the selected candidate state transition (transition number N) and outputs 1 as a transition propriety f. When there is no allowed candidate state transition, the transition propriety f is set to 0.

An example of the operation of the optimization apparatus according to the second embodiment will now be described.

In each iteration described above, the thermal excitation energy generator 70 receives random numbers {ui} which are uniform random numbers independent of one another and whose number is equal to the number of candidate state transitions and makes conversions by the use of the noise table. By multiplying values obtained by the conversions by a common temperature T, the thermal excitation energy generator 70 then generates a thermal excitation energy threshold in the Metropolis method or the Gibbs method.

The subtractor 71 subtracts the offset y outputted by the accumulator 22a from a thermal excitation energy generated according to each candidate state transition. The comparator 72 compares each subtraction result outputted by the subtractor 71 and an energy change {−ΔE$_i$}. On the basis of a comparison result, the comparator 72 outputs a transition propriety {fi} indicative of the propriety of each state transition. When there are a plurality of allowed state transitions, the selector 73 selects one of them at random by the use of a random number.

When there is an allowed candidate state transition and a change in state occurs (when a transition propriety f is 1), the offset y is reset by the accumulator 22a to zero. When none of candidate state transitions is allowed and a stay in the current state is made (when a transition propriety f is 0), the accumulator 22a adds an offset increment value Δy to the offset y. By doing so, the accumulator 22a exercises control so that the offset y will monotonically increase with respect to the length of a stay in the current state.

All state transitions are selected as candidates. When the current state is not a local minimum, a state transition occurs in approximately one iteration. If this is taken into consideration, it will be desirable to determine the offset increment value Δy in the following way. When the length of a stay at a local minimum becomes about several iterations, the offset increment value Δy is set to be equivalent to energy needed to escape from the local minimum.

Figure 9:
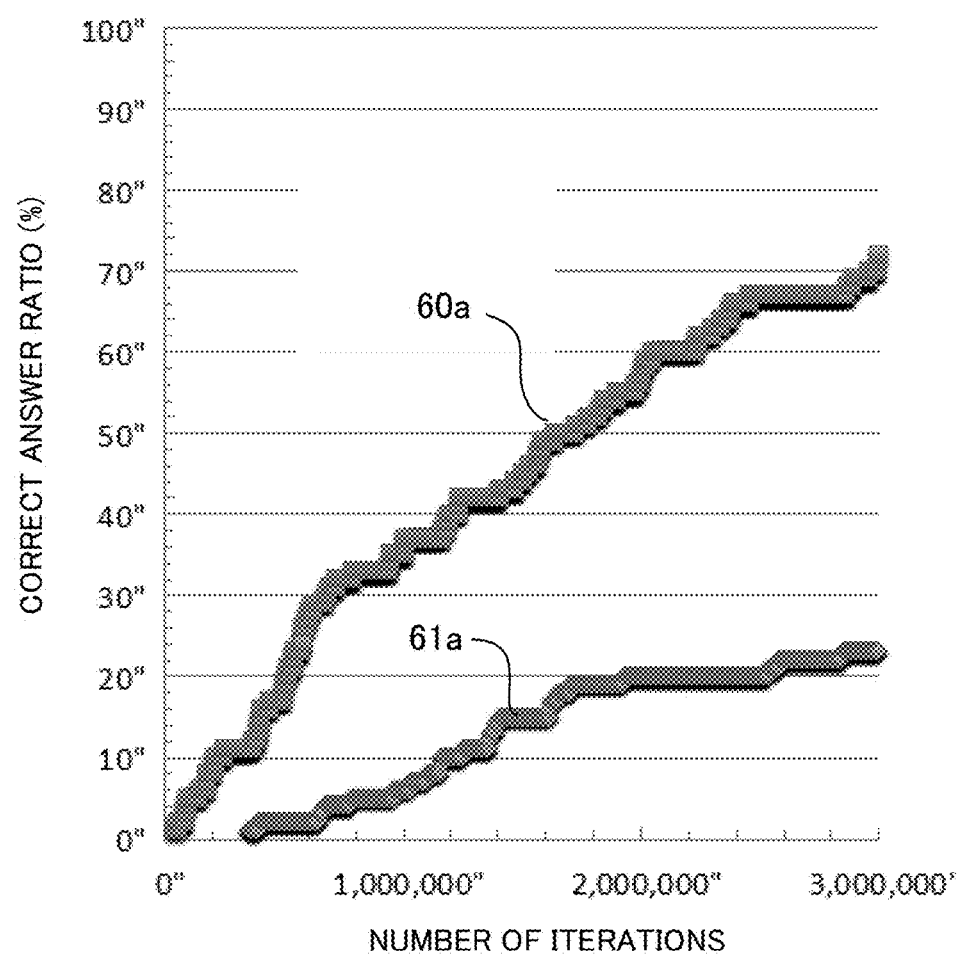
FIG. 9 illustrates an example of a software simulation result of a simulated annealing method realized by the use of the transition control section illustrated in FIG. 8.

FIG. 9 illustrates an example of a software simulation result of a simulated annealing method realized by the use of the transition control section illustrated in FIG. 8. A problem to be optimized is a traveling salesman problem including 32 cities which is formulated by the Ising model (Boltzmann machine). In FIG. 9, a horizontal axis indicates the number of iterations and a vertical axis indicates a ratio at which an optimum solution is obtained (correct answer ratio (%)). A result 60a indicates the relationship between the number of iterations and a correct answer ratio obtained by the use of the transition control section 20b illustrated in FIG. 8. A result 61a indicates the relationship between the number of iterations and a correct answer ratio obtained at the time of eliminating the subtractor 71 and the accumulator 22a from the transition control section 20b.

As is seen from FIG. 9, the use of the transition control section 20b in the second embodiment gives a correct answer faster than the use of the transition control section 20b not including the subtractor 71 or the accumulator 22a. If the transition control section 20b not including the subtractor 71 or the accumulator 22a is used, the number of iterations $N_{99}$ which produces a correct answer with a probability of 99 percent is $5.3 \times 10^7$. If the transition control section 20b in the second embodiment is used, the number of iterations $N_{99}$ which produces a correct answer with a probability of 99 percent is $1.1 \times 10^7$. That is to say, the use of the transition control section 20b in the second embodiment gives a correct answer about five times faster than the use of the transition control section 20b not including the subtractor 71 or the accumulator 22a.

An example of an optimization apparatus using the transition control section 20b illustrated in FIG. 8 will now be described.

Figure 10:
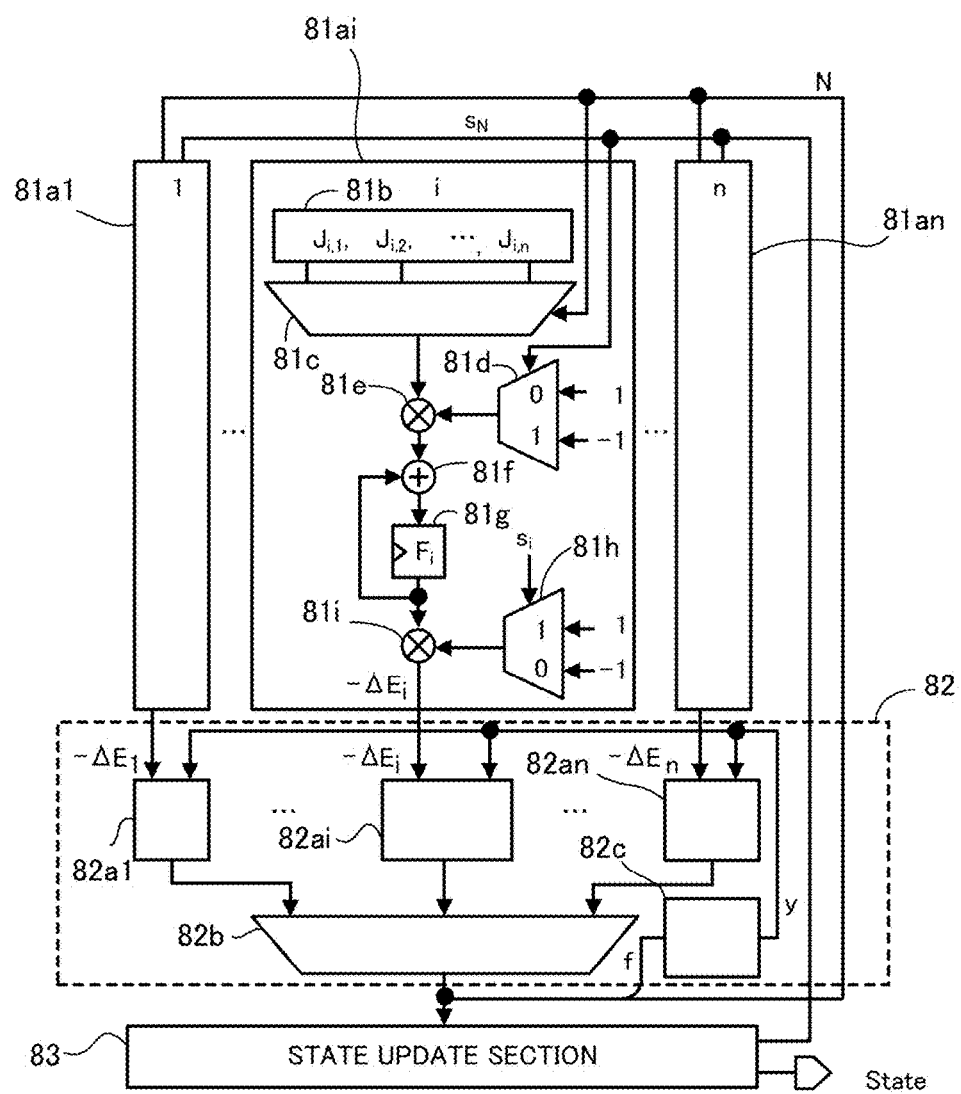
FIG. 10 illustrates an example of an optimization apparatus using the transition control section illustrated in FIG. 8.

FIG. 10 illustrates an example of an optimization apparatus using the transition control section illustrated in FIG. 8.

An optimization apparatus 80 includes energy calculation sections 81a1, ..., 81ai, ..., and 81an, a transition control section 82 and a state update section 83.

Each of the energy calculation sections 81a1 through 81an is an example of the energy calculation section 12 illustrated in FIG. 13. The energy calculation sections 81a1 through 81an calculate and output energy changes ($-\Delta E_1, \ldots, -\Delta E_i, \ldots,$ and $-\Delta E_n$ (corresponding to the above $\{-\Delta E_i\}$)).

For example, the energy calculation section 81ai includes a register 81b, selectors 81c and 81d, a multiplier 81e, an adder 81f, a register 81g, a selector 81h, and a multiplier 81i.

The register 81b stores interaction coefficients $J_{i,1}$, $J_{i,2}, \ldots,$ and $J_{hd\ i,n}$ included in, for example, the above expression 10.

The interaction coefficients $J_{i,1}$ through $J_{i,n}$ are calculated in advance according to a problem to be calculated by a control unit (not illustrated) inside the optimization apparatus 80, a unit outside the optimization apparatus 80, or the like and are stored in the register 81b. The above interaction coefficients $J_{i,1}$ through $J_{i,n}$ may be stored in a memory such as a RAM.

On the basis of a transition number N outputted by the transition control section 82, the selector 81c selects and outputs one of the interaction coefficients $J_{i,1}$ through $J_{i,n}$ stored in the register 81b.

For example, when N=n is inputted to the selector 81c, the selector 81c selects the interaction coefficient $J_{i,n}$.

The selector 81d realizes the calculation (1-2 $s_i$) in expression 11. On the basis of a value of a spin $s_N$ after update outputted by the state update section 83, the selector 81d selects and outputs 1 or −1. If a value of the spin $s_N$ after update is 0, then the selector 81d selects and outputs −1. If a value of the spin $s_N$ after update is 1, then the selector 81d selects and outputs 1.

The multiplier 81e outputs the product of an interaction coefficient outputted by the selector 81c and a value outputted by the selector 81d.

The adder 81f outputs the sum of a multiplication result outputted by the multiplier 81e and a value stored in the register 81g.

The register 81g stores a value outputted by the adder 81f in synchronization with a clock signal (not illustrated). The register 81g is, for example, a flip-flop. The value stored in the register 81g is a local field $F_i$ in expression 12.

If a value of a spin $s_i$ after update is 0, then the selector 81h outputs 1. If a value of the spin $s_i$ after update is 1, then the selector 81h outputs −1. An output of the selector 81h corresponds to (1-2 $s_i$) in expression 11.

The multiplier 81i outputs the product of a local field $F_i$ outputted by the register 81g and a value outputted by the selector 81h as an energy change ($-\Delta E_i$).

The transition control section 82 includes circuit parts 82a1, ..., 82ai, ..., and 82an, a selector 82b, and an offset control circuit 82c.

The circuit parts 82a1 through 82an carry out the functions of the thermal excitation energy generator 70, the subtractor 71, and the comparator 72 included in the transition control section 20b illustrated in FIG. 8 for respective candidate state transitions. The selector 82b corresponds to the selector 73 illustrated in FIG. 8. Furthermore, the offset control circuit 82c corresponds to the accumulator 22a illustrated in FIG. 8.

Therefore, the transition control section 82 performs the same operation that is performed by the transition control section 20b illustrated in FIG. 8.

The state update section 83 has the function of the state holding section 11 illustrated in FIG. 13. On the basis of a transition propriety f and a transition number N outputted by the transition control section 82, the state update section 83 updates values of spins $s_1$ through $s_n$ held and outputs a combination of values of the spins $s_1$ through $s_n$ (State). Furthermore, the state update section 83 outputs a value after update of a spin (indicated by $s_N$ in the example of FIG. 10).

The transition control section 20b or 82 in the second embodiment is applicable to the above optimization apparatus 80.

Third Embodiment

Figure 11:
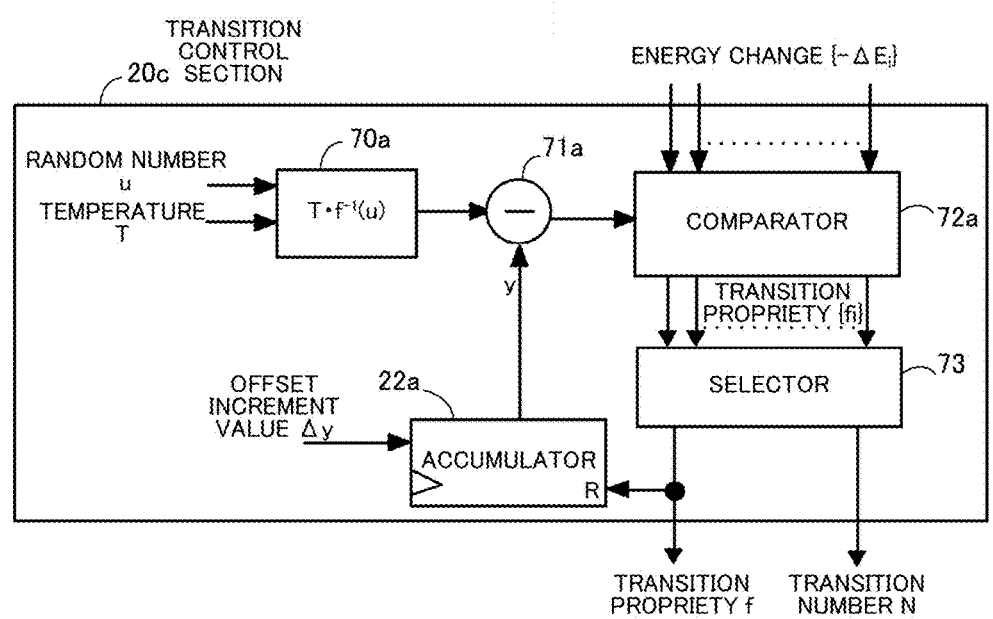
FIG. 11 illustrates an example of the circuit structure of a transition control section included in an optimization apparatus according to a third embodiment.

FIG. 11 illustrates an example of the circuit structure of a transition control section included in an optimization apparatus according to a third embodiment. A circuit which generates a random number is not illustrated in FIG. 11. Furthermore, components in FIG. 11 which are the same as those of the transition control section 20b illustrated in FIG. 8 are marked with the same numerals.

Description will now be given on the assumption that a transition control section 20c illustrated in FIG. 11 selects all one-bit flips (all changes in spin value) as candidate state transitions. However, only part of bit inversions may be selected as candidate state transitions.

The transition control section 20c includes an accumulator 22a. This is the same with the transition control section 20a illustrated in FIG. 3. In addition, the transition control section 20c includes a thermal excitation energy generator 70a, a subtractor 71a, a comparator 72a, and a selector 73.

The thermal excitation energy generator 70a includes a noise table which converts a random number u (uniform random number) common to all candidate state transitions to a value of the above inverse function $f^{-1}(u)$. Furthermore, the thermal excitation energy generator 70a outputs the product of the above value and a temperature T as a thermal excitation energy threshold in the Metropolis method or the Gibbs method.

The subtractor 71a subtracts an offset y common to all the candidate state transitions from the thermal excitation energy threshold.

By comparing a subtraction result outputted by the subtractor 71a and an energy change $\{-\Delta E_i\}$ for each state transition, the comparator 72a outputs a transition propriety $\{fi\}$ indicative of the propriety of each state transition.

When there are a plurality of allowed candidate state transitions on the basis of a transition propriety $\{fi\}$, the selector 73 selects one of them at random by the use of a random number. The selector 73 then outputs a number of the selected candidate state transition (transition number N) and outputs 1 as a transition propriety f. When a state transition does not occur, a transition propriety f is 0.

An example of the operation of the optimization apparatus according to the third embodiment will now be described.

In each iteration described above, the thermal excitation energy generator 70a receives a random number u which is a uniform random number and which is common to all bit inversions and make a conversion by the use of the noise table. By multiplying a value obtained by the conversion by a temperature T, the thermal excitation energy generator 70a then generates a thermal excitation energy threshold in the Metropolis method or the Gibbs method.

The subtractor 71a subtracts an offset y outputted by the accumulator 22a from the thermal excitation energy threshold generated. The comparator 72a compares a subtraction result outputted by the subtractor 71a and an energy change $\{-\Delta E_i\}$. On the basis of a comparison result, the comparator 72a outputs a transition propriety $\{fi\}$ indicative of the propriety of each state transition. When there are a plurality of allowed state transitions, the selector 73 selects one of them at random by the use of a random number.

The offset y is controlled in the same way as with the transition control section 20b in the second embodiment.

Figure 12:
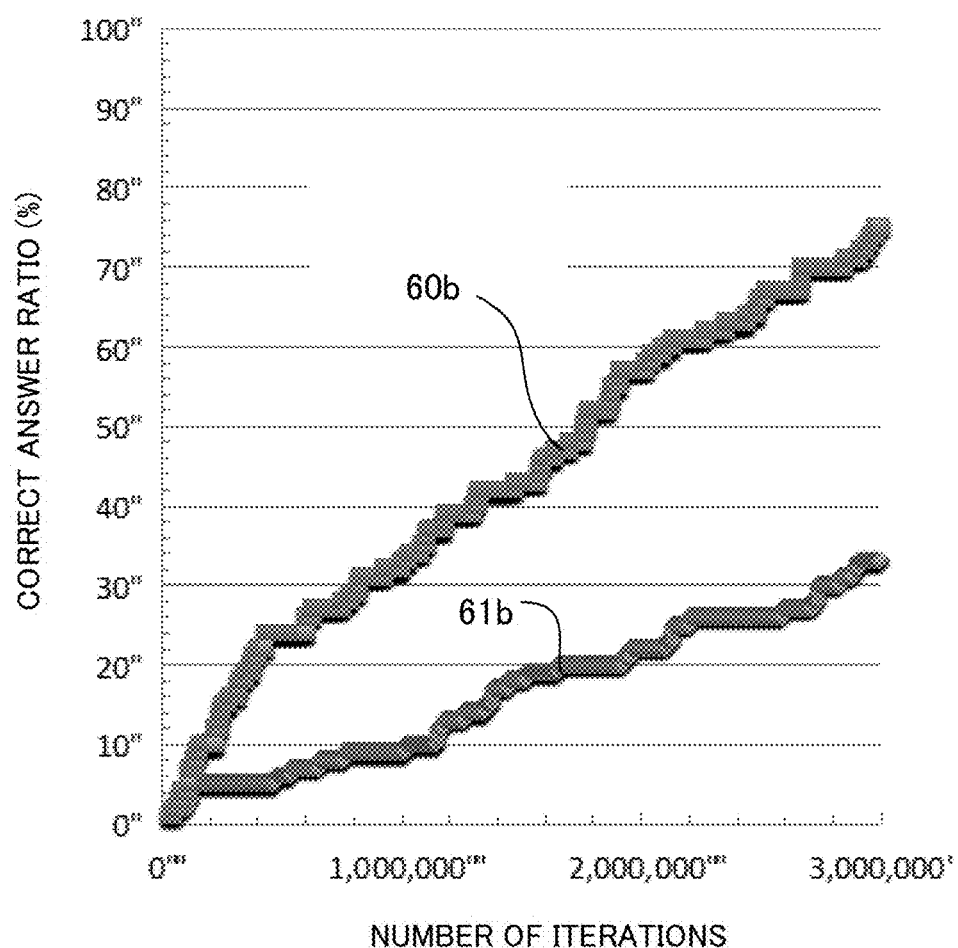
FIG. 12 illustrates an example of a software simulation result of a simulated annealing method realized by the use of the transition control section illustrated in FIG. 11.

FIG. 12 illustrates an example of a software simulation result of a simulated annealing method realized by the use of the transition control section illustrated in FIG. 11. A problem to be optimized is a traveling salesman problem including 32 cities which is formulated by the Ising model (Boltzmann machine). In FIG. 12, a horizontal axis indicates the number of iterations and a vertical axis indicates a ratio at which an optimum solution is obtained (correct answer ratio (%)). A result 60b indicates the relationship between the number of iterations and a correct answer ratio obtained by the use of the transition control section 20c illustrated in FIG. 11. A result 61b indicates the relationship between the number of iterations and a correct answer ratio obtained at the time of eliminating the subtractor 71a and the accumulator 22a from the transition control section 20c.

As is seen from FIG. 12, the use of the transition control section 20c in the third embodiment gives a correct answer faster than the use of the transition control section 20c not including the subtractor 71a or the accumulator 22a. If the transition control section 20c not including the subtractor 71a or the accumulator 22a is used, the number of iterations $N_{99}$ which produces a correct answer with a probability of 99 percent is $3.4 \times 10^7$. If the transition control section 20c in the third embodiment is used, the number of iterations $N_{99}$ which produces a correct answer with a probability of 99 percent is $1.0 \times 10^7$. That is to say, the use of the transition control section 20c in the third embodiment gives a correct answer about three times faster than the use of the transition control section 20c not including the subtractor 71a or the accumulator 22a.

Furthermore, with the transition control section 20c in the third embodiment a random number u common to all state transitions is used. As a result, circuit area is small compared with the transition control section 20b in the second embodiment.

According to an aspect, the present disclosure reduces calculation time without deteriorating convergence.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An optimization apparatus comprising:
    a state holding section that holds values of a plurality of state variables included in an evaluation function indicative of an energy;
    an energy calculation section that calculates an energy change of the energy for each of a plurality of state transitions in a case where each of the plurality of state transitions occurs according to a change in one of the values of the plurality of state variables;
    a temperature control section that controls a temperature; and
    a transition control section that adds, when stochastically determining based on the temperature, the energy change, and a random number whether to allow one of the plurality of state transitions according to a relative relationship between the energy change and a thermal excitation energy, an offset to the energy change and that exercises control so as to set the offset at a local minimum, at which the energy is locally minimized, to be larger than an offset at the time of the energy not being minimized.
2. The optimization apparatus according to claim 1, wherein:
    the transition control section includes an offset control circuit; and the offset control circuit sets, when allowing one of the plurality of state transitions, the offset to zero, and monotonically increases, when allowing none of the plurality of state transitions, the offset with respect to a length of a stay in a current state represented by the values of the plurality of state variables by increasing the offset every iteration.

3. The optimization apparatus according to claim 2, wherein:
the offset control circuit includes an accumulator having a reset terminal; and
the accumulator sets, upon receipt of a first signal that is indicative that one of the plurality of state transitions is allowed, the offset to zero, and adds, upon receipt of a second signal that is indicative that none of the plurality of state transitions is allowed, an offset increment value to the offset.

4. The optimization apparatus according to claim 3, wherein:
the accumulator further has a clock terminal; and
each time a pulse signal is inputted from a state machine to the clock terminal, the accumulator adds the offset increment value to the offset.

5. The optimization apparatus according to claim 1, wherein the transition control section includes:
a selector that selects, according to the random number, one of energy changes calculated for the plurality of state transitions;
a storage unit that outputs, according to the random number, a value of an inverse function of a function indicative of an allowance probability of a state transition represented by a Metropolis method or a Gibbs method;
a multiplier that outputs a threshold of the thermal excitation energy represented by a product of the value of the inverse function and the temperature; and
a comparator that outputs a determination result that indicates whether to allow the state transition corresponding to the energy change selected by the selector and that is represented by a value corresponding to a result of a comparison between a sum of the energy change selected by the selector and the offset and the threshold of the thermal excitation energy.

6. The optimization apparatus according to claim 1, wherein the transition control section includes:
a storage unit that outputs, according to random numbers independent of one another for the plurality of state transitions, a plurality of values of an inverse function of a function indicative of allowance probabilities of the plurality of state transitions represented by a Metropolis method or a Gibbs method;
a multiplier that outputs thresholds of the thermal excitation energy represented by a plurality of products of the plurality of values and the temperature;
a comparator that outputs a plurality of determination results that indicate whether to allow the plurality of state transitions and that are represented by a plurality of values corresponding to results of comparisons between a plurality of sums of energy changes calculated for the plurality of state transitions and the offset and the plurality of products; and
a selector that selects, when there are a plurality of allowed state transitions among the plurality of state transitions based on the plurality of determination results, one of the plurality of allowed state transitions.

7. The optimization apparatus according to claim 1, wherein the transition control section includes:

a storage unit that outputs, according to the random number common to all of the plurality of state transitions, a value of an inverse function of a function indicative of allowance probabilities of the plurality of state transitions represented by a Metropolis method or a Gibbs method;
a multiplier that outputs a threshold of the thermal excitation energy represented by a product of the value of the inverse function and the temperature;
a comparator that outputs a plurality of determination results that indicate whether to allow the plurality of state transitions and that are represented by a plurality of values corresponding to results of comparisons between a plurality of sums of energy changes calculated for the plurality of state transitions and the offset and the product; and
a selector that receives the plurality of determination results and that selects, when there are a plurality of allowed state transitions among the plurality of state transitions, one of the plurality of allowed state transitions.

8. The optimization apparatus according to claim 1, wherein the transition control section includes:
a storage unit that outputs, according to a random number common to every two or more state transitions of the plurality of state transitions, a plurality of values of an inverse function of a function indicative of allowance probabilities of the plurality of state transitions represented by a Metropolis method or a Gibbs method;
a multiplier that outputs thresholds of the thermal excitation energy represented by a plurality of products of the plurality of values and the temperature;
a comparator that outputs a plurality of determination results that indicate whether to allow the plurality of state transitions and that are represented by a plurality of values corresponding to results of comparisons between a plurality of sums of energy changes calculated for the plurality of state transitions and the offset and the plurality of products; and
a selector that receives the plurality of determination results and that selects, when there are a plurality of allowed state transitions among the plurality of state transitions, one of the plurality of allowed state transitions.

9. A method for controlling an optimization apparatus, the method comprising:
holding, by a state holding section included in the optimization apparatus, values of a plurality of state variables included in an evaluation function indicative of an energy;
calculating, by an energy calculation section included in the optimization apparatus, an energy change of the energy for each of a plurality of state transitions in a case where each of the plurality of state transitions occurs according to a change in one of the values of the plurality of state variables;
controlling, by a temperature control section included in the optimization apparatus, a temperature; and
adding, by a transition control section included in the optimization apparatus, when stochastically determining based on the temperature, the energy change, and a random number whether to allow one of the plurality of state transitions according to a relative relationship between the energy change and a thermal excitation energy, an offset to the energy change, and exercising control so as to set the offset at a local minimum, at which the energy is locally minimized, to be larger than an offset at the time of the energy not being minimized.

* * * * *